March 29, 1966  D. T. N. WILLIAMSON ETAL  3,243,178
WORKPIECE SUPPORTS FOR MACHINE TOOLS
Filed Sept. 22, 1964                    5 Sheets-Sheet 1

INVENTORS
David T. N. Williamson
Douglas W. B. Muir
Albert A. Mark
By Watson, Cole, Grindle & Watson
ATTORNEYS March 29, 1966  D. T. N. WILLIAMSON ETAL  3,243,178
WORKPIECE SUPPORTS FOR MACHINE TOOLS
Filed Sept. 22, 1964    5 Sheets-Sheet 3

INVENTORS
David T.N. Williamson
Douglas W.B. Muir
Albert J. Mark
By Watson, Cole, Grindle & Watson
ATTORNEYS March 29, 1966    D. T. N. WILLIAMSON ETAL    3,243,178
WORKPIECE SUPPORTS FOR MACHINE TOOLS Filed Sept. 22, 1964      5 Sheets-Sheet 4

INVENTORS
David T. N. Williamson
Douglas W. B. Muir
Albert G. Mark
By Watson, Cole, Grindle & Watson
ATTORNEYS

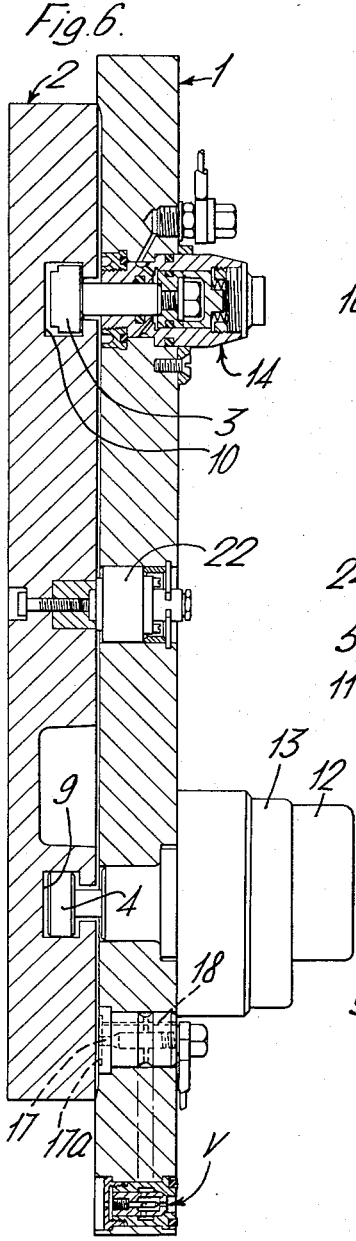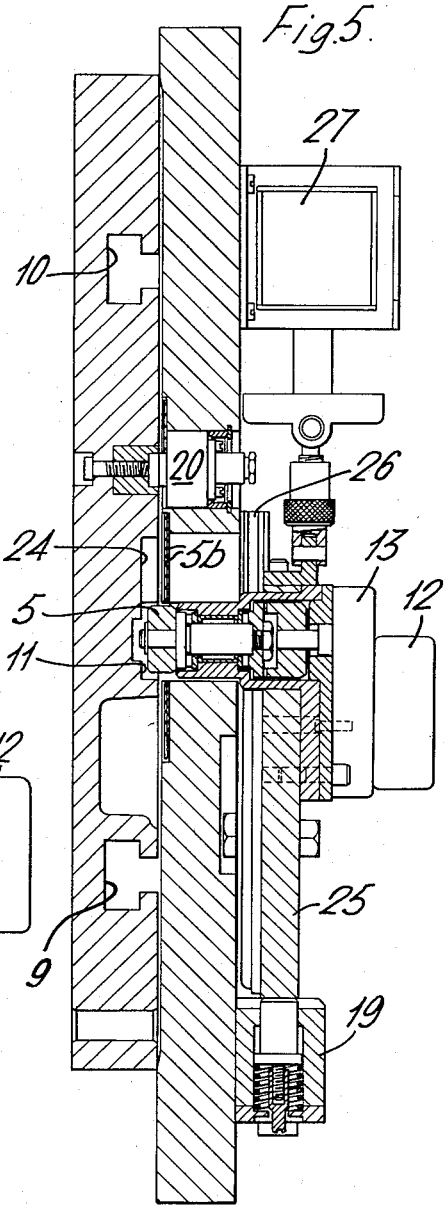

United States Patent Office 3,243,178
Patented Mar. 29, 1966

3,243,178
WORKPIECE SUPPORTS FOR MACHINE TOOLS
David Theodore Nelson Williamson, Douglas William Ballantyne Muir, and Albert George Monk, London, England, assignors to The Molins Organisation Limited, London, England, a British company
Filed Sept. 22, 1964, Ser. No. 398,200
Claims priority, application Great Britain, Sept. 27, 1963, 38,228/63
10 Claims. (Cl. 269—58)

This invention relates to workpiece supports for use with machine tools and more particularly to an improved workpiece support suitable for use with automatic, e.g. tape-controlled, machine tools.

Conventional machine tools have for many years been provided with quite simple forms of workpiece support comprising merely some form of manually-operated clamp, and it has been necessary for an operator of some skill to manipulate the tool as, once a workpiece has been clamped to its support, correct positioned relationship has had to be established between the workpiece and the cutters or the like. The advent of automatic controls, in which relative movement between the workpiece and the cutters or the like is controlled by data read from a magnetic or punched tape, has removed the need for an operator during the actual machining but manual positioning of the workpiece to an accurate starting position has still been a necessity.

The present invention is associated with the realisation that maximum utilisation and most economic operation of an automatic machine tool is obtainable if the initial positioning of a workpiece can be achieved automatically. To allow for variations in the shape and size of workpiece to be handled, we provide support plates, termed pallets, for the workpieces, these pallets being of predetermined form so as to fit precisely upon a bed or table of the machine tool. Then an operator may lead workpieces in proper positions on spare pallets at any time, and the loaded pallets may be fed to the machine tool as and when required, the standard form of the pallets permitting them to be positioned on the tool by automatic means.

It is therefore the principal object of the present invention to provide an improved workpiece support for use with machine tools, having means whereby pallets of predetermined form may be automatically brought to an exact predetermined position upon loading.

According to the invention, there is provided a workpiece support for holding a workpiece in a defined position in a machine tool, comprising means for receiving a workpiece-carrier of predetermined form, positioning means for producing movement of said carrier in two of three mutually perpendicular dimensions relative to said receiving means, clamping means operable to hold said carrier immovably against a reference surface of said receiving means to locate said carrier in the third of said dimensions, sensing means adapted to produce control signals whenever the carrier reaches a predetermined position relative to said receiving means in each of said two dimensions, and control means responsive to each individual control signal to stop operation of the positioning means in the corresponding dimension and responsive to both said control signals to initiate operation of the clamping means.

The positioning means may take various forms but it is preferred to employ eccentric rollers engageable with grooves in the workpiece-carrier. In one preferred arrangement, each workpiece-carrier has two parallel longitudinal grooves from one of which a short lateral groove extends at a position substantially half-way along the longitudinal groove; three eccentric rollers are provided, two of them engaging the longitudinal groove not having the lateral groove, and the third being movably mounted so that when a workpiece-carrier is introduced to the support, it may be moved past the rollers until the third roller comes into alignment with the lateral groove. Thereupon the said third roller moves into the lateral groove, and the three rollers then are caused to rotate about their respective axes, the third roller serving to produce small longitudinal movements of the carrier while the other rollers produce small lateral movements.

As the sensing means, magnetic devices are preferably employed. Most conveniently there are provided three such devices, e.g. one in the vicinity of each of the rollers, the device near the third roller being arranged to detect correct longitudinal positioning of the carrier while the other two devices are arranged to detect correct lateral positioning. Each sensing device may comprise an E-shaped magnetic core as a stator member and an insert in the carrier as an armature member; the insert provides a block e.g. a disc of highly permeable material e.g. a ferrite surrounded by a ring of non-magnetic material such as brass. The tips of the three legs or poles of said E-shaped core are co-planar and so spaced that when said insert is placed symmetrically over the core the highly-permeable disc largely covers the tips of both outer poles, so there is a bridge of low reluctance across the pole tips. Any movement of the carrier and hence of the insert across the tips of the core poles moves the highly-permeable disc away from one or both of the outer pole tips; if such movement is in a direction parallel to the "upright" of the E, a substantial change in the magnetic characteristics of one half of the core is produced because the highly-permeable disc moves out of register with one of the outer pole tips but any movement at right-angles to the "upright" reduces the area of the insert facing both of the outer pole tips, and affects the characteristics of both halves of the core, but less abruptly. (In either case, the outer pole tip or tips no longer in register with the highly-permeable disc will be confronted with part of the brass ring which provides a gap in the magnetic circuit of the corresponding part or parts of the core). One or more windings are placed on the core and it will be understood that the inductance of any such winding (and in the case where two or more windings are employed the coupling between them) is different when the insert lies symmetrically over the pole tips from when the insert is in any other position, the change being especially abrupt when the insert moves from the symmetrical position in a direction parallel to the length of the "upright" of the E-shaped core. Accordingly, such winding or windings may be connected as part of an electrical circuit so arranged that a distinctive electrical signal is produced whenever the insert is symmetrically disposed relative to the core, or at least symmetrically disposed as considered in a direction at right-angles to the length of the "upright" of said core. It is especially advantageous to employ windings on the core as a transformer, as then it can very readily be arranged for no output signal to appear unless the insert is asymmetrically disposed relative to the core.

The workpiece-carrier normally comprises a steel plate, of substantial thickness to ensure rigidity, and the receiving means comprises a base plate which may be a composite structure, or, preferably, a casting embodying appropriate recesses to accommodate the eccentric rollers or other positioning means and the sensing means. Preferably the arrangement is such that the workpiece-carrier has a generally plane rear face confronting a front face of the base plate of the receiving means, the latter having a part or parts of its front face accurately finished to provide the reference surface against which the rear face of said carrier engages upon operation of the clamping means. It is desirable that the said rear face of said carrier and/or the cooperating part or parts serving as the reference surface should be provided with a multiplicity of grooves as otherwise foreign bodies, notably swarf from cutting operations performed by the machine tool, are liable to be trapped between said rear face and reference surface and prevent proper location of the workpiece-carrier in the third dimension when the clamping means is operated. Even with such grooves, the trapping of foreign bodies cannot be entirely eliminated and therefore it is preferred to provide detecting means, arranged to come into operation whenever the clamping means is operated, to give a warning if the rear face of said carrier and said reference surface do not achieve proper contact. Such detecting means may take various forms; a convenient arrangement is to provide a small hole in the reference surface at each of a number of points near its edge, for example near each of its corners if the reference surface is rectangular, and connect each of such holes to a source of compressed air and a pressure-sensitive switch or the like. Then whenever the clamping means is operated, if a proper contact is established between the rear face of the workpiece-carrier and the reference surface the holes will be blocked and air pressure in them will rise, while if such proper contact is not made, the air pressure will remain at or near atmospheric pressure due to leakage between the said rear face and reference surface. Thus at this stage the air pressure in the holes connected to the suction device will indicate whether or not proper contact has been achieved and the pressure-sensitive switches or the like will be in a corresponding condition. Said switches may be connected to energise suitable warning devices and/or to control circuits of the machine tool to prevent operation thereof until proper contact is attained.

In order that the invention may be well understood, a preferred embodiment thereof will now be described in more detail, reference being made to the accompanying drawings, in which:

FIGURES 5 and 6 are sectional views in the planes indicated in FIGURE 3 by lines V—V and VI—VI respectively; each of these sections shows the plate of FIGURE 2 with the pallet of FIGURE 4 supported thereon.

Figure 1:
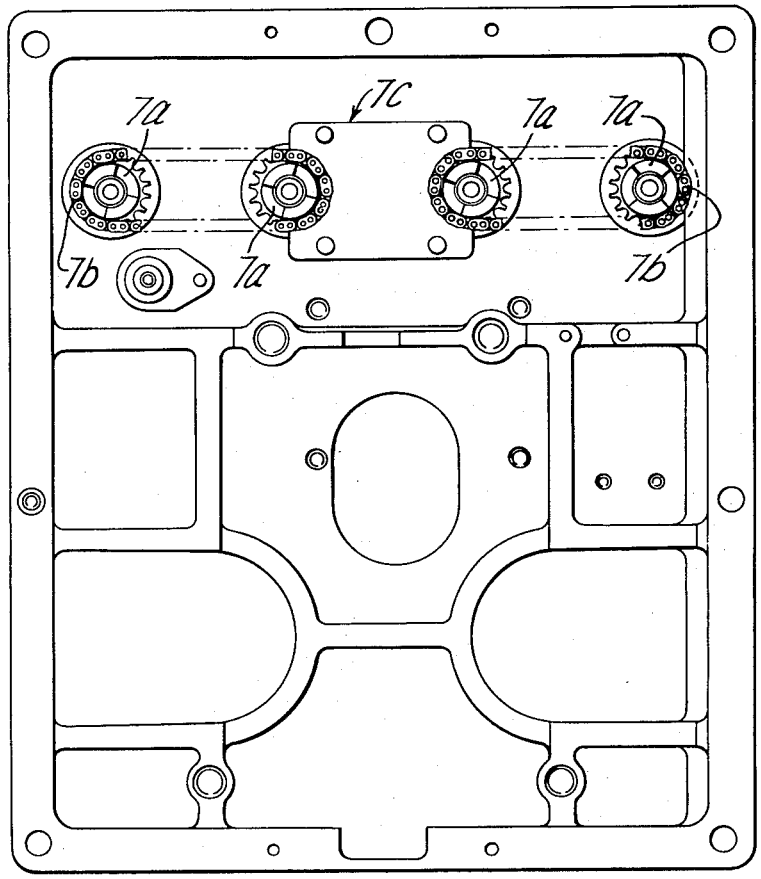
FIGURE 1 is a front elevation of a main supporting frame.

The drawings illustrate an embodiment of the invention intended for use with a machine tool (not shown) capable of drilling or end milling, and having its tool supporting spindle or spindles horizontal; each workpiece to be machined requires to be supported for vertical movement in a plane normal to the axis of the tool-supporting spindle, positioning in the mutually perpendicular horizontal directions being achieved by movement of said spindle. The supporting frame of FIGURE 1 is therefore in use mounted in the machine tool in a vertical position as drawn, with the plate of FIGURES 2 and 3 secured to its front face, and each workpiece to be machined is carried by a pallet as shown in FIGURE 4, which in turn is held against the plate. Movements of the workpiece during machining are produced by moving the supporting frame of FIGURE 1 bodily, carrying the plate and pallet with it.

Figure 2:
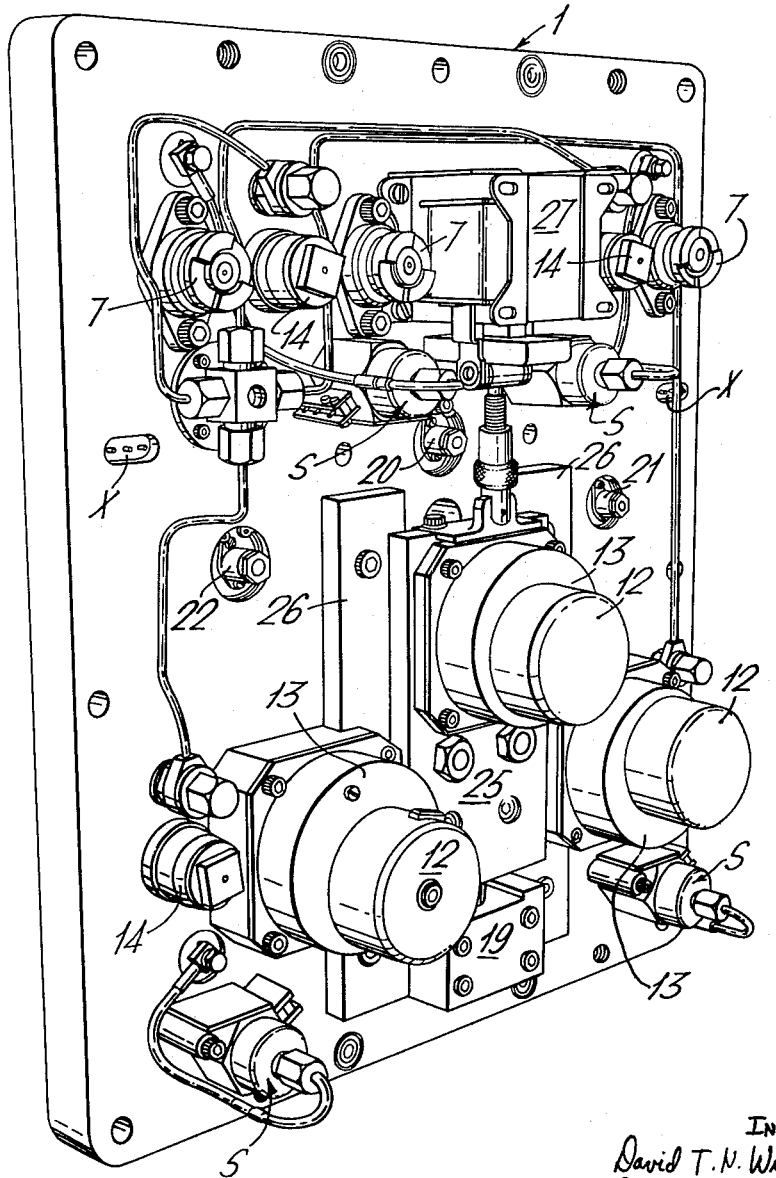
FIGURE 2 is a rear perspective view of a carrier plate with various fittings, which in use is mounted on the frame of FIGURE 1.

It will be seen from a comparison of FIGURE 1 and FIGURE 2 that the supporting frame shown in FIGURE 1 is a casting formed with internal webs so as to be of sufficient rigidity while allowing spaces for various parts assembled to the rear of the plate shown in FIGURE 2 when the latter is secured to the supporting frame, hence the form of the supporting frame needs no detailed explanation. The supporting frame carries certain drive components to which reference will later be made.

Figure 3:
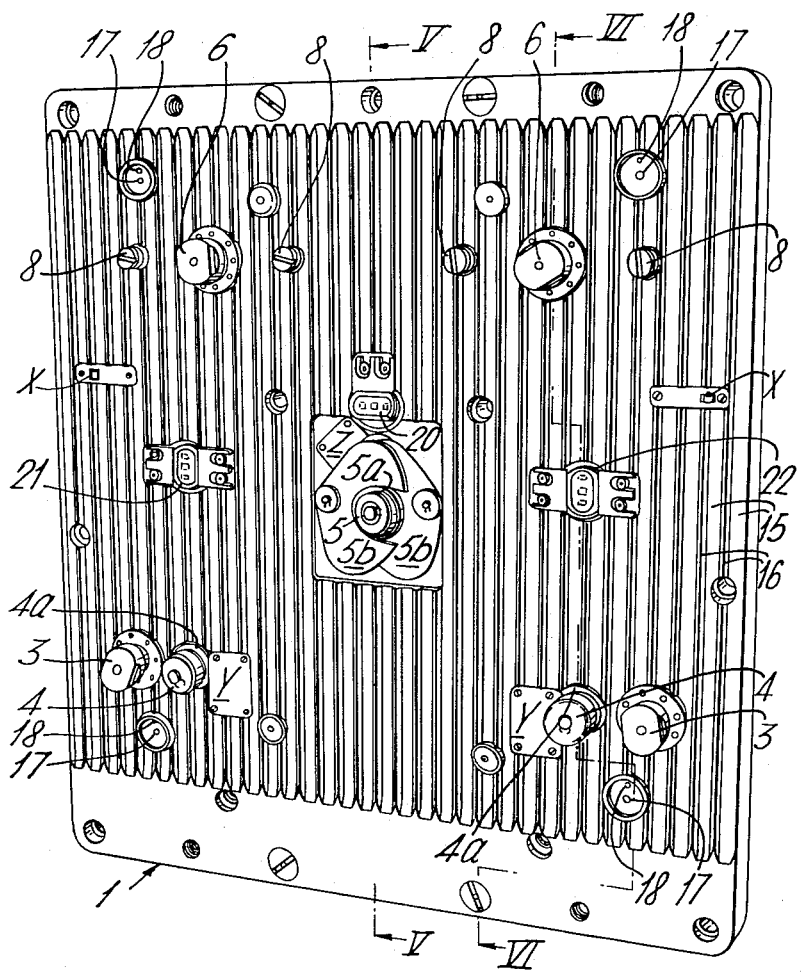
FIGURE 3 is a front perspective view of the plate of FIGURE 2.
Figure 4:
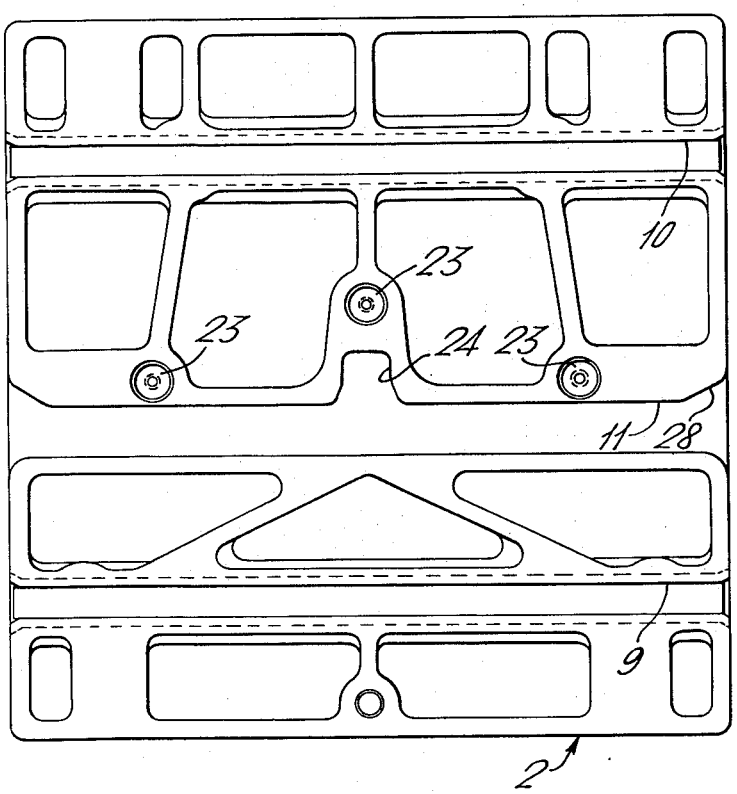
FIGURE 4 is a rear elevation of a pallet.

Turning first to FIGURES 2 and 3, therefore, the plate there shown, generally indicated at 1, carries a number of members which project from the front of the plate 1 for engagement with the rear face of a workpiece-carrying pallet 2 (FIGURE 4). Said members are found at three levels; in a lower row there are two clamping members 3 and two positioning rollers 4; in an intermediate row there is one positioning roller 5; and in an upper row there are two clamping members 6, and four driving rollers 8.

The placing of the rows of rollers and clamping members corresponds to that of three horizontal grooves on the rear face of the pallet, FIGURE 4. These comprise lower and upper grooves 9, 10 respectively, both of which are of undercut T-section, and an intermediate groove 11 generally of rectangular section; the forms of these grooves can be seen in FIGURES 5 and 6.

Positioning rollers 4, 5 are all eccentrically mounted on their respective shafts, and have individual drives in the form of small electric motors 12 with reduction gear assemblies 13 secured to the rear face of plate 1. Clamping members 3, 6 are all substantially larger than their supporting shafts, and the latter are of such length that when a pallet is carried on the plate 1, with the several rollers and clamping members in their respective grooves of the pallet, the clamping members 3, 6 are received in the wide undercut or base portions of T-section grooves 9, 10 respectively. On the back of the plate 1 (FIGURE 2) are four clamping devices 14, each connected to one of the clamping members 3, 6, such clamping devices comprising hydraulic actuators (whose structure is clearly shown in FIGURE 6) arranged (upon application of hydraulic pressure thereto) to pull members 3, 6 axially towards the front surface of the plate 1 and hence to grip the overhanging flanges of the grooves 9, 10 of the pallet and urge the latter into firm contact with the plate 1 (see FIGURES 5 and 6).

Driving rollers 8 carried on shafts extending through plate 1 and carrying at their rear ends dog couplings 7; when the plate 1 is assembled to the supporting frame (FIGURE 1) couplings 7 engage with complementary coupling members 7a carried on shafts connected by chains 7b to a common drive indicated at 7c. When a pallet is first introduced to the device being described, it is advanced with its grooves 9–11 in alignment with the corresponding ones of rollers 4–8, and as rollers 8 engage in the upper groove 10 they serve to continue the forward feed of the pallet towards its desired position.

The front of the plate 1 is grooved, as shown in FIGURE 3, having its surface covered with longitudinal grooves 15 separated by ribs 16, the latter collectively providing a reference surface to which the pallet is clamped by the device 14. The grooves 15 provide for swarf or other foreign bodies which may be found on the front surface of the plate 1 and/or the rear surface of the pallet, so that the presence of such bodies need not prevent proper contact of the pallet and plate when the clamping devices 14 are operated. The ribs 16 are of inverted-V-section, so that on operating device 14 any particles of swarf or the like trapped between ribs 16 and the rear surface of the pallet may in the majority of cases be cut.

To allow for the fact that a large or unusually hard fragment of swarf or the like trapped between a rib 16 and the pallet may not be cut and therefore will prevent proper clamping of the pallet to the plate, provision is made for detecting faulty seating of the pallet on the plate. To this end, at four positions the plate has inserts containing drillings 17 the position being so chosen that the drillings will be closed by corner portions of the pallet when the latter is clamped to the plate. Behind the plate the four drillings are connected by conduits to a common compressed air source (not shown) arranged to operate at the same time as the clamping devices 14.

Over a small circular area around each drilling the front (pallet-receiving) face of the insert in the plate is slightly recessed as shown at 17a. Within each such recessed area, a bleed hole 18 is provided, communicating with atmosphere at the rear of the plate.

The drilling are supplied with compressed air from any suitable source (not shown) which is connected via suitable pressure-reducing and flow-regulating valves to a manifold chamber from which separate conduits lead to each drilling. In each conduit a controllable restriction is formed by a needle valve V (FIGURE 6) so that the portion of conduit between said restriction and the drilling serves as a measuring chamber, and between these two chambers a pressure-responsive electric switch S (FIGURE 2) is connected. Said switch has a normal position when the pressure in the associated chamber is that existing when the only outlet for air is via the bleed hole 18, and an abnormal position which it assumes when incorrect sealing of a pallet allows air to escape more easily so that the chamber pressure is lower.

Clearly, whenever a pallet is properly clamped on the plate all the drillings will be in a similar condition, in that air will only be able to escape via drillings 18, and the pressures established in the measuring chambers will maintain the switches in their normal positions. If however air can escape from any one drilling between the pallet and plate, by virtue of improper seating of the adjacent area of the pallet on the plate, there will be an unbalance of pressures and the revelant switch will be in its abnormal position.

The pressure-responsive switches have electrical connections such that they must all be in their normal positions (and hence the pallet must be properly clamped to the plate) before electric power is available to permit machining operations to be carried out, while when any one of such switches is in its other position electric power is applied to any desired alarm or indicating devices, to draw an operator's attention to the fact that proper pallet seating has not been achieved, and/or to devices for removing the fault (e.g. by releasing the clamping devices and blowing air between the plate and pallet to clear swarf or other foreign bodies which may be trapped therebetween).

Figure 7:
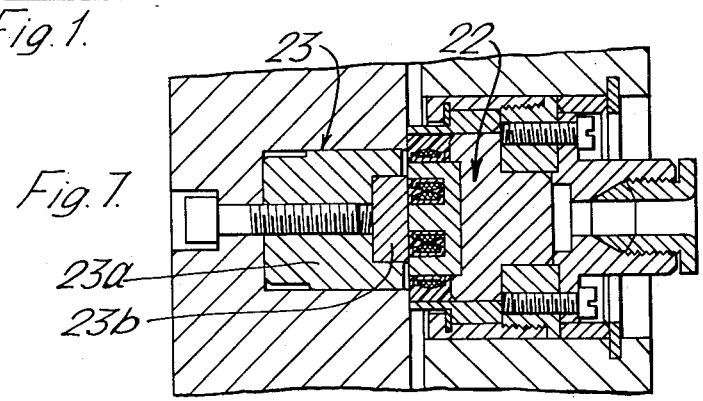
FIGURE 7 is an enlarged sectional view of a sensing device.

The plate 1 carries three sensing devices 20, 21, 22. Each of these devices comprises a magnetic core which is E-shaped and has the tips of its three poles terminating at spaced positions flush with the front surface of the plate 1 (or more precisely, the level of the top edges of ribs 16 which as noted above collectively provide the reference surface of said plate). The pallet, which is of steel, has three inserts 23 in its rear surface at such positions that when the pallet is properly positioned on the plate 1, these inserts lie symmetrically over the pole tips of devices 20, 21, 22. Each insert 23 comprises (see FIGURE 7) a brass body 23a lying slightly below the surface of the pallet and carrying in its turn a ferrite disc 23b inserted in its exposed surface and protruding therefrom so that the top surface of the disc is flush with the surface of the pallet. Discs 23b are each large enough just to cover the pole tips of the associated sensing device. Any slight displacement of the pallet, in any direction parallel to the surface of the plate, causes part of the brass ring formed by the exposed part of body 23a to appear above one or other of the pole-piece tips in place of the ferrite disc. With one of the inserts in its symmetrical position over the cooperating pole-pieces, it will be understood that magnetic flux in the core, due to current in one of its windings, will be relatively high as the magnetic circuit of the E-shaped core is completed by the low-reluctance ferrite disc, but as there is a displacement of the disc in a direction parallel to the upright of the E-shaped core of the sensing device the ferrite disc moves away from one of the pole tips, producing a relatively large gap in the magnetic circuit so that the reluctance of that part of the core increases materially. The core is provided with a winding connected in an electric circuit which produces an output whose magnitude depends upon the inductance of said winding—when the associated insert 23 lies symmetrically above the core, that inductance will have a different value from that when the insert 23 is displaced by quite a small distance from the symmetrical position in a direction parallel to the length of the upright of the E-shaped core, due to the change in reluctance previously mentioned. The electric circuit is arranged to produce an output sufficient to serve a control signal when the insert 23 is in the symmetrical position and such control signal from each sensing device is applied to control circuits (not shown) so as to stop the positioning roller which is associated with that sensing device i.e. which serves to move the workpiece-carrier in such manner that the insert 23 of that device moves across its sensing device parallel to the length of the upright of the E-shaped core.

It will be noted that any movement of the insert 23 at right-angles to the upright of the core produces equal changes in reluctance in both parts of the core (such change being also less abrupt than in the case of movement parallel to the upright) and the winding is preferably arranged so that such equal changes of reluctance do not affect its inductance.

A particularly convenient arrangement of winding on the E-shaped core is to have three coils, one on each leg of the core, with those on the outer legs interconnected in series opposition. Then the single coil on the central leg and the interconnected coils of the outer legs may be employed as a transformer; application of an A.C. signal to the single coil will produce no output in the interconnected coils when the cooperating insert 23 is symmetrically disposed over the core (or displaced at right-angles to the upright of the core) but an output will appear as soon as there is any displacement of the insert parallel to said upright, as the outputs from the two interconnected coils, which are connected in opposition, then cease to be equal in magnitude.

Now turning to the positioning rollers 4, 5 all these are eccentric rollers and serve when rotated to effect small variations of the position of the pallet on the plate 1. The two rollers 4 both engage groove 9 of the pallet and serve to produce vertical movements thereof. Roller 5, although the groove 11 in which it operates is parallel to groove 9, serves to provide horizontal adjustment of the pallet, the groove 11 having a short vertical branch 24 into which the roller 5 enters as the pallet approaches its correct position for clamping. To allow for the necessary vertical movement of roller 5 and its driving assembly of motor 12 and gearing 13, these parts are not secured to the plate 1 but carried on a sub-frame 25 slidable vertically on the plate 1 between guides 26. A solenoid assembly 27 secured between the sub-frame 25 and the plate 1 produces said vertical movement when required.

For this purpose, the sub-frame 25 is spring-biased to a position such that the roller 5 is slightly out of line with the groove 11 of the pallet when the latter is first brought into engagement with one of the rollers 4 and fed towards the other roller 4 and roller 5. From FIGURE 4 it will be noted that the end portions 28 of groove 11 are slightly divergent and thus can receive the roller 5 as the pallet is fed, one wall of the groove 11 serving as a cam to urge roller 5 into correct alignment with the main part of groove 11. The consequent slight movement of roller 5 as it passes through the end portion 28 of groove 11 is employed to operate a micro-switch 19 and hence condition control circuits for the solenoid assembly 27; when the pallet reaches a position such that the roller 5 is free to move into branch 24 of groove 11 the aforesaid microswitch operates in the reverse direction and the conditioned control circuits then energise a solenoid in assembly 27 which causes the sub-frame 25 to move so that roller 5 enters branch 24 of groove 11, where, as will be apparent, any rotation of said roller 5 will produce horizontal variation of the position of the pallet.

Once this position is reached, the pallet is very near to its desired final position and such position can be attained by rotation of rollers 4, 5. Accordingly, when the sub-frame 25 and roller 5 complete their movement under the influence of the solenoid in assembly 27, a further microswitch (not shown) closes and the three motors 12 driving the two rollers 4 and roller 5 are energised, simultaneously or one at a time as preferred. As each motor 12 operates, it is de-energised and stopped under control of the adjoining sensing device when the output of the latter indicates that its insert 23 is in or near the symmetrical position; it may restart if operation of the other rollers disturb this positioning. A common control circuit is connected to all three sensing devices, and is so arranged that when all said devices are delivering outputs indicating that the respective inserts 23 are in their symmetrical positions, a relay (not shown) operates to prevent further operation of all three motors 12 and initiate operation of the clamping means to secure the pallet in the position it has attained. When operation of the clamping means is initiated, before actual clamping of the pallet takes place each of the sensing devices in turn is connected to a position checking circuit to verify that all sensing devices indicate correct positioning of the pallet. Preferably this checking operation is performed twice before the pallet is clamped, and immediately after clamping a similar checking operation is carried out. If during such checking a position error is detected, the aforementioned relay is released and positioning by motors 12 is performed again; if such error is detected after clamping, then the clamps are of course released to permit the pallet positioning to be corrected. If for any reason, e.g. the presence of swarf between the pallet and the plate 1, the pallet does not seat properly on the plate the pressure sensitive switches and associated parts give warning and prevent further operation as previously described.

However, assuming that the pallet does seat properly on the plate 1, all is now ready for machining of the workpiece which accordingly proceeds. The tool may be advanced into contact with the workpiece, i.e. may be moved at right-angles to the plane of FIGURE 1, and the part of the workpiece which it engages may be determined by vertical movement of the plate 1, carrying the pallet and workpiece with it, and/or horizontal movement of the tool at right-angles to its spindle. Initiation of the machining may be effected without delay by connecting the pressure-responsive switches and the position checking circuit so that a suitable electric starting signal is delivered to control circuits for the machine tool whenever the positions of all the said switches indicate correct seating of the pallet and no positioning error is detected by the checking circuit.

In FIGURE 3 are shown certain features not hitherto mentioned, serving purely ancillary purposes. First, reference is made to the two microswitches X; these switches are arranged to be operated when a pallet is clamped to the plate 1 and may be connected in control circuits of the apparatus as may be desired so as to prevent unnecessary or conflicting operations, e.g. when a pallet is clamped in position, switches X may prevent the drive rollers 8 being driven and when no pallet is present, switches X may prevent redundant operations such as operation of the clamping devices.

Rollers 4 have on their shafts cams 4a operating microswitches Y, connected as "off-zero" switches. Switches Y are arranged to be closed whenever their associated rollers are turned away from a selected rest position in which the rollers 4 do not impede loading or unloading of pallets. Whenever the clamping devices are operated to secure a pallet, and the aforementioned checking circuit shows no error in the position of the pallet, a circuit containing the motors 12 of rollers 4 is energised so as to return said rollers to the rest position, and switches Y open under control of cams 4a when that position is attained.

Roller 5 has an associated cam 5a operating a microswitch Z secured to plate 25. It will be remembered that cam 5 serves to provide lateral adjustment of the position of the pallet and it is desirable to provide for a fault indication to be given if excessive adjustment in this dimension is needed. Hence cam 5a is arranged to closed microswitch Z whenever the roller 5 turns so far that the lateral movement of the pallet exceeds the maximum desired and closure of the switch Z is arranged to stop rotation of roller 5 and provide a fault indication (e.g. by warning light or audible alarm).

Because of the movement of roller 5 produced by the solenoid assembly 27, the shaft of said roller 5 requires a slot in plate 1 within which to move. To prevent passage of swarf or other foreign matter to the rear of plate 1, we provide two overlapping pivoted plates 5b, arranged symmetrically about the shaft of roller 5, which plates 5b together serve to block those portions of said slot which at any moment are not occupied by said shaft.

Thus it will be seen that a device of considerable utility has been provided, which may be employed to secure improved utilisation of machine tools of various forms by permitting quick and accurate loading thereof without dependence on the skill and availability of an operator.

It will be understood that various changes and modifications in the details described above may be made without departing from the scope of the invention, e.g. other forms of position sensing devices may be employed.

We claim:

1. A workpiece support for holding a workpiece in a defined position in a machine tool, comprising means for receiving a workpiece-carrier of predetermined form, said receiving means having a reference surface, positioning means for producing movement of said carrier in two of three mutually perpendicular dimensions relative to said receiving means, clamping means operable to hold said carrier immovably against said reference surface to locate said carrier in the third of said dimensions, sensing means adapted to produce control signals whenever the carrier reaches a predetermined position relative to said receiving means in each of said two dimensions, and control means responsive to each individual control signal to stop operation of the positioning means in the corresponding dimension and responsive to both said control signals to initiate operation of the clamping means.

2. A workpiece support as claimed in claim 1, in which the positioning means comprises eccentric rollers engageable with grooves in the workpiece-carrier.

3. A workpiece support as claimed in claim 2, in which the positioning means comprises three eccentric rollers, two of said rollers being arranged to engage one of two parallel longitudinal grooves in the workpiece-carrier and the third of said rollers being arranged to engage the other of said grooves, said third roller being movably mounted to permit its entry into a lateral groove in the workpiece-carrier, said lateral groove extending from said other longitudinal groove.

4. A workpiece support as claimed in claim 3, in which the sensing means comprises magnetic devices.

5. A workpiece support as claimed in claim 4, in which at least one of the magnetic devices comprises an E-shaped magnetic core, carrying at least one winding as a stator member for cooperation with an armature member comprising an insert in the form of a block of highly permeable material surrounded by a ring of non-magnetic material in the workpiece-carrier, the tips of the three legs of said E-shaped core being coplanar and so spaced that when said insert is placed symmetrically over the core the disc or block of highly permeable material largely covers the tips of both outer poles, but any movement of the insert across the tips of the core poles moves said block away from at least one of the outer pole tips, and the winding being connected as part of an electrical circuit so arranged that a distinctive electrical signal is produced whenever the insert is symmetrically disposed relative to the core.

6. A workpiece support as claimed in claim 5, in which the receiving means comprises a base plate embodying recesses to accommodate the positioning means and sensing means.

7. A workpiece support as claimed in claim 6, in which the receiving means has a front face to confront a generally plane rear face of the workpiece-carrier, at least a part of said front face being accurately finished to provide the reference surface.

8. A workpiece support as claimed in claim 7 in which at least one of the said front and rear faces is provided with a multiplicity of ribs separated by grooves.

9. A workpiece support as claimed in claim 8, including means operable whenever the clamping means is operated for detecting whether proper contact between the workpiece-carrier and reference surface has been achieved.

10. A workpiece support as claimed in claim 7, including means operable whenever the clamping means is operated for detecting whether proper contact between the workpiece-carrier and reference surface has been achieved, and in which the detecting means comprises means for supplying compressed air to one or more holes in the reference surface so disposed as to be closed by the rear face of the workpiece-carrier upon operation of the clamping means, and at least one pressure-sensitive switch arranged to respond to air pressure changes in said holes due to covering or uncovering thereof, said switch being connected to energise warning devices and/or to control circuits of the machine tool to prevent operation thereof until proper contact between said rear face and said reference surface is attained.

No references cited.

WILLIAM W. DYER, JR., *Primary Examiner.*

G. A. DOST, *Assistant Examiner.*